(12) United States Patent
Smith

(10) Patent No.: US 12,481,119 B2
(45) Date of Patent: Nov. 25, 2025

(54) CREEP MITIGATION IN BALL-BEARING SYSTEMS

(71) Applicant: META PLATFORMS, INC., Menlo Park, CA (US)

(72) Inventor: Clinton Smith, Kirkland, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 747 days.

(21) Appl. No.: 17/504,439

(22) Filed: Oct. 18, 2021

(65) Prior Publication Data

US 2023/0122116 A1  Apr. 20, 2023

(51) Int. Cl.
  *G02B 7/10*  (2021.01)
  *F16C 33/58*  (2006.01)

(52) U.S. Cl.
  CPC ............. *G02B 7/10* (2013.01); *F16C 33/586* (2013.01); *F16C 2380/00* (2013.01)

(58) Field of Classification Search
  CPC . G02B 7/10; G02B 7/02; G02B 27/00; G02B 27/01; G02B 27/0176; G02B 27/0093; G02B 27/0101; G02B 27/0172; G02B 2027/0187; G02B 2027/0161; G02B 2027/0154; G02B 2027/0178; F16C 33/58; F16C 33/586; F16C 29/04; F16C 29/045; F16C 2380/00
  USPC .................... 359/683, 13, 630–633, 826, 827
  See application file for complete search history.

(56) References Cited

U.S. PATENT DOCUMENTS

| 10,610,775 B1 * | 4/2020 | Ebert ...................... G06F 3/013 |
| 2012/0237147 A1 * | 9/2012 | Utz .......................... G02B 7/08 |
| | | 384/49 |

FOREIGN PATENT DOCUMENTS

CN  208125996  * 11/2018  ............... G02B 7/02

OTHER PUBLICATIONS

English translation of CN208125996. (Year: 2018).*

(Continued)

*Primary Examiner* — Jie Lei
(74) *Attorney, Agent, or Firm* — Greenberg Traurig, LLP

(57) ABSTRACT

A head-mounted display includes a varifocal actuation block and an optics block coupled to the varifocal actuation block. An anti-creep system located in the varifocal actuation block includes a plurality of anti-creep mechanisms that are configured to prevent bearing ball creep associated with bearing balls in the varifocal actuation block. The bearing balls are used to move a movable carriage that is coupled to a fixed carriage in the head-mounted display via the anti-creep mechanism. The anti-creep mechanisms prevent bearing ball creep associated with the bearing balls from occurring in the varifocal actuation block by limiting the movement in an angular direction of the bearing balls that are used to move the movable carriage in a first direction in the head-mounted display.

19 Claims, 7 Drawing Sheets

(56) References Cited

OTHER PUBLICATIONS

Moore International, "Schneeberger Formula S Linear Cross Roller Bearings—Moore International," Uploaded on Jul. 18, 2013, 4 pages, Retrieved from the Internet: URL: https://www.youtube.com/watch?v=DNzRX12k59w, Retrieved on [Jul. 11, 2022].

NB Corporation of America, "NB Anti Cage-Creep Cross Roller Slide Guides and Tables," 3 pages, Retrieved from the Internet: URL: https://www.nbcorporation.com/shop/slide-way-gonio-way/crossed-roller-slide-ways/, https://www.youtube.com/watch?v=2-s4X10Xbps, Retrieved on [Jul. 11, 2022].

* cited by examiner

CREEP MITIGATION IN BALL-BEARING SYSTEMS

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Head-mounted display devices (also called herein head-mounted displays) have gained popularity as a mechanism for providing visual information to a user. Virtual reality head-mounted displays simulate virtual environments and augmented reality head-mounted displays present virtual images overlapping with a real-world view. Both systems generally require stereoscopic images displayed on a display of the head-mounted device to illustrate an illusion of depth. Displaying stereoscopic images often requires varifocal systems that utilize varifocal optical elements.

The varifocal optical elements utilized in varifocal systems often use bearing systems that tend to exhibit "bearing creep". Bearing creep (or bearing cage creep) generally occurs when bearings drift away from a centered position relative to a fixed and moving race. Bearing creep has many causes including, but not limited to, insufficient rigidity in the surrounding structure, insufficient precision, vertical operation, high accelerations and speeds, disparity in thermal expansions, etc. Typical solutions to bearing creep utilize a rack and pinion style gear system. In the rack and pinion style gear system, a pinion gear or studded roller maintains the alignment of the bearing cage relative to the fixed and moving races via a rack that is attached to the rails. Rack and opinion style solutions that are used to reduce bearing creep add a considerable amount of manufacturing complexity, cost, and weight to the varifocal system of the head-mounted display to implement.

DETAILED DESCRIPTION

Figure 1:
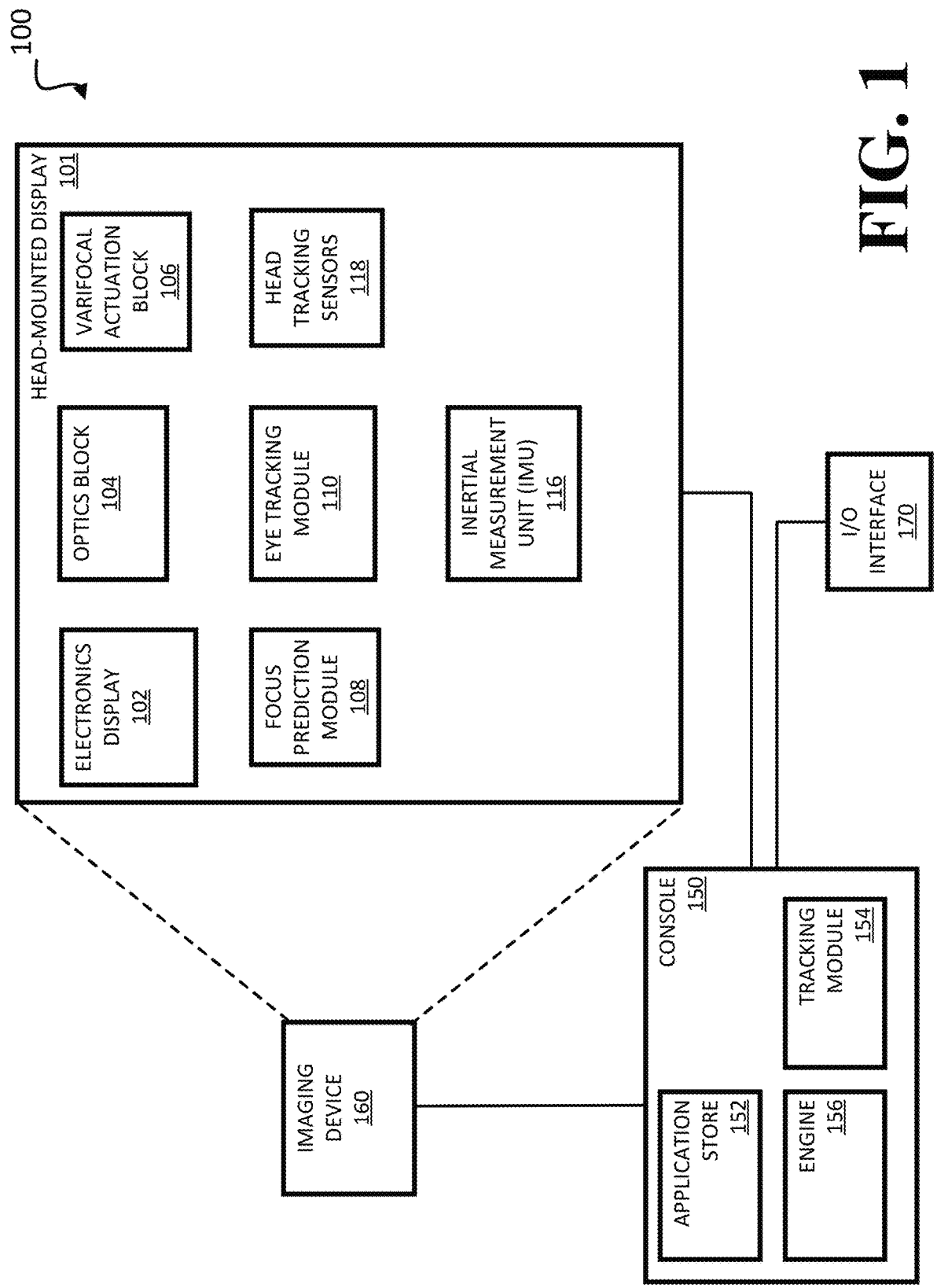
FIG. 1 is a block diagram illustrating a varifocal system in accordance with some embodiments.

FIG. 1 illustrates a varifocal system 100 in which a head-mounted display (HMD) 101 operates. Varifocal system 100 may be for use as a virtual reality (VR) system, an augmented reality (AR) system, a mixed reality (MR) system, or some combination thereof. In some embodiments, the varifocal system 100 includes HMD 101, imaging device 160, and input/output (I/O) interface 170, which are each coupled to console 150. While FIG. 1 shows a single HMD 101, a single imaging device 160, and a single I/O interface 170, in other embodiments, any number of these components may be included in the system. For example, there may be multiple HMDs each having an associated I/O interface 170 and being monitored by one or more imaging devices 160, with each HMD 101, I/O interface 170, and imaging devices 160 communicating with the console 150. In alternative configurations, different and/or additional components may also be included in the system environment.

In some embodiments, HMD 101 presents content to a user which may include, for example, images, video, audio, or some combination thereof. Audio content may be presented via a separate device (e.g., speakers and/or headphones) external to HMD 101 that receives audio information from HMD 101, console 150, or both. HMD 101 includes electronic display 102, optics block 104, varifocal actuation block 106, focus prediction module 108, eye tracking module 110, inertial measurement unit (INU) 116, and head tracking sensors 118.

Optics block 104 directs light from electronic display 102 to an exit pupil for viewing by a user using one or more optical elements, such as apertures, Fresnel lenses, convex lenses, concave lenses, filters, and so forth, and may include combinations of different optical elements. In some embodiments, one or more optical elements in optics block 104 may have one or more coatings, such as anti-reflective coatings. Magnification of the image light by optics block 104 allows electronic display 102 to be physically smaller, weigh less, and consume less power than larger displays. Additionally, magnification of the image light may increase a field of view of the displayed content. For example, the field of view of the displayed content is such that the displayed content is presented using almost all (e.g., 150 degrees diagonal), and in some cases all, of the user's field of view. The optics block 104 can be a single lens or a system of lenses, such as a pancake lens.

In some embodiments, optics block 104 may be designed to correct one or more optical errors. Examples of optical errors include: barrel distortion, pincushion distortion, longitudinal chromatic aberration, transverse chromatic aberration, spherical aberration, chromatic aberration, field curvature, astigmatism, and so forth. In some embodiments, content provided to electronic display 102 for display is pre-distorted, and optics block 104 corrects the distortion when it receives image light from electronic display 102 generated based on the content.

Varifocal actuation block 106 causes optics block 104 to vary the focal distance of HMD 101 to keep a user's eyes in a zone of comfort as vergence and accommodation change. In one embodiment, varifocal actuation block 106 physically changes the distance between electronic display 102 and optical block 104 by moving electronic display 102 or optical block 104 (or both). In some embodiments, varifocal actuation block 106 utilizes an anti-creep system to mitigate bearing creep (or bearing ball creep) associated with bearing balls that are used by carriages in the varifocal actuation block 106 to move the optics block 104. Thus, varifocal actuation block 106 may include actuators or motors that move electronic display 102 and/or optical block 104 to change the distance between them. Varifocal actuation block 106 may be separate from or integrated into optics block 104 in various embodiments.

In some embodiments, focus prediction module 108 is an encoder or encoders that include logic that tracks the position or state of optics block 104 to predict to one or more future states or locations of optics block 104. For example, focus prediction module 108 accumulates historical information corresponding to previous states of optics block 104 and predicts a future state of optics block 104 based on the previous states.

Eye tracking module 110 tracks an eye position and eye movement of a user of HMD 101. A camera or other optical sensor inside HMD 101 captures image information of a user's eyes, and eye tracking module 110 uses the captured information to determine interpupillary distance, interocular distance, a three-dimensional (3D) position of each eye relative to HMD 101 (e.g., for distortion adjustment purposes), including a magnitude of torsion and rotation (i.e., roll, pitch, and yaw) and gaze directions for each eye. Many methods for tracking the eyes of a user can be used by eye tracking module 110.

IMU 116 is an electronic device that generates calibration data based on measurement signals received from one or more of head tracking sensors 118, which generate one or more measurement signals in response to motion of HMD 101. Examples of head tracking sensors 118 include accelerometers, gyroscopes, magnetometers, other sensors suitable for detecting motion, correcting error associated with IMU 116, or some combination thereof. Head tracking sensors 118 may be located external to IMU 116, internal to IMU 116, or some combination thereof.

I/O interface 170 is a device that allows a user to send action requests to console 150. An action request is a request to perform a particular action. For example, an action request may be to start or end an application or to perform a particular action within the application. I/O interface 170 may include one or more input devices. Example input devices include a keyboard, a mouse, a game controller, or any other suitable device for receiving action requests and communicating the received action requests to console 150. An action request received by I/O interface 170 is communicated to console 150, which performs an action corresponding to the action request. In some embodiments, I/O interface 170 may provide haptic feedback to the user in accordance with instructions received from console 150. For example, haptic feedback is provided by the I/O interface 170 when an action request is received, or console 150 communicates instructions to I/O interface 170 causing I/O interface 170 to generate haptic feedback when console 150 performs an action.

Console 150 provides content to HMD 101 for presentation to the user in accordance with information received from imaging device 160, HMD 101, or I/O interface 170. In the example shown in FIG. 1, console 150 includes application store 152, tracking module 154, and engine 156. Some embodiments of console 150 have different or additional modules than those described in conjunction with FIG. 1. Similarly, the functions further described below may be distributed among components of console 150 in a different manner than is described here.

Application store 152 stores one or more applications for execution by console 150. An application is a group of instructions, that when executed by a processor, generates content for presentation to the user. Content generated by an application may be in response to inputs received from the user via movement of HMD 101 or interface device 170. Examples of applications include gaming applications, conferencing applications, video playback application, or other suitable applications.

Tracking module 154 calibrates varifocal system 100 using one or more calibration parameters and may adjust one or more calibration parameters to reduce error in determining position of HMD 101.

Engine 156 executes applications within the system and receives position information, acceleration information, velocity information, predicted future positions, or some combination thereof for HMD 101 from tracking module 154. Based on the received information, engine 156 determines content to provide to HMD 101 for presentation to the user, such as a virtual scene.

Figure 2:
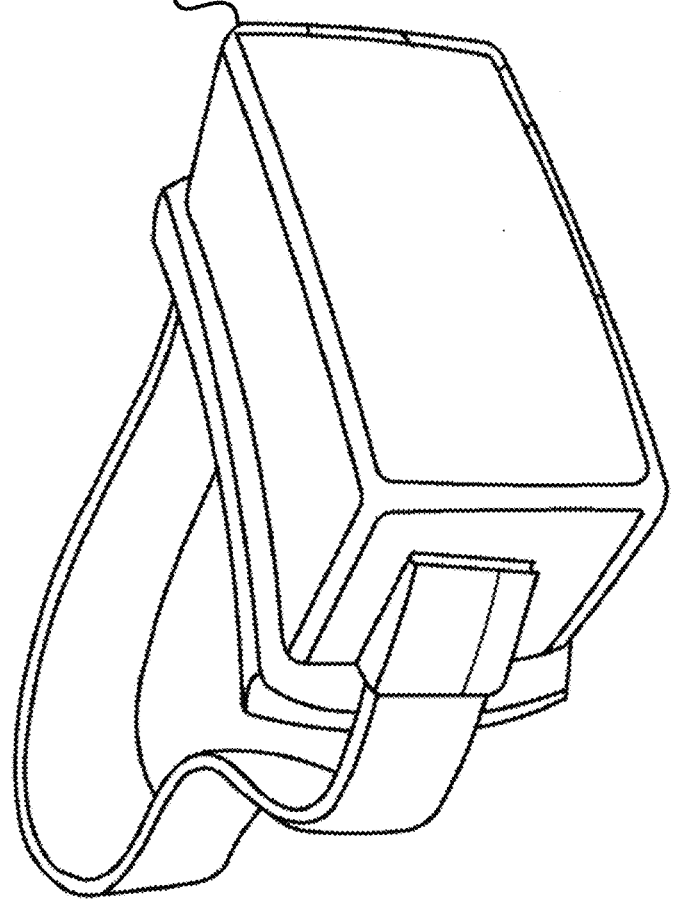
FIG. 2 illustrates a head mounted display in accordance with some embodiments.

FIG. 2 illustrates a diagram of HMD 101, in accordance with at least one embodiment. In some embodiments, HMD 101 includes the anti-creep system that is used to mitigate bearing ball creep in the varifocal actuation block 106. In some embodiments, HMD 101 includes a front rigid body and a band that goes around a user's head. The front rigid body includes the varifocal actuation block 106 that includes the anti-creep system, as well as one or more electronic display elements corresponding to electronic display 102, IMU 116, and head tracking sensors 118. In this example, head tracking sensors 118 are located within IMU 116. Note in some embodiments, where the HMD 101 is used in AR and/or MR applications portions of the HMD 101 may be at least partially transparent (e.g., an internal electronic display, one or more sides of the HMD 101, etc.).

Figure 3A:
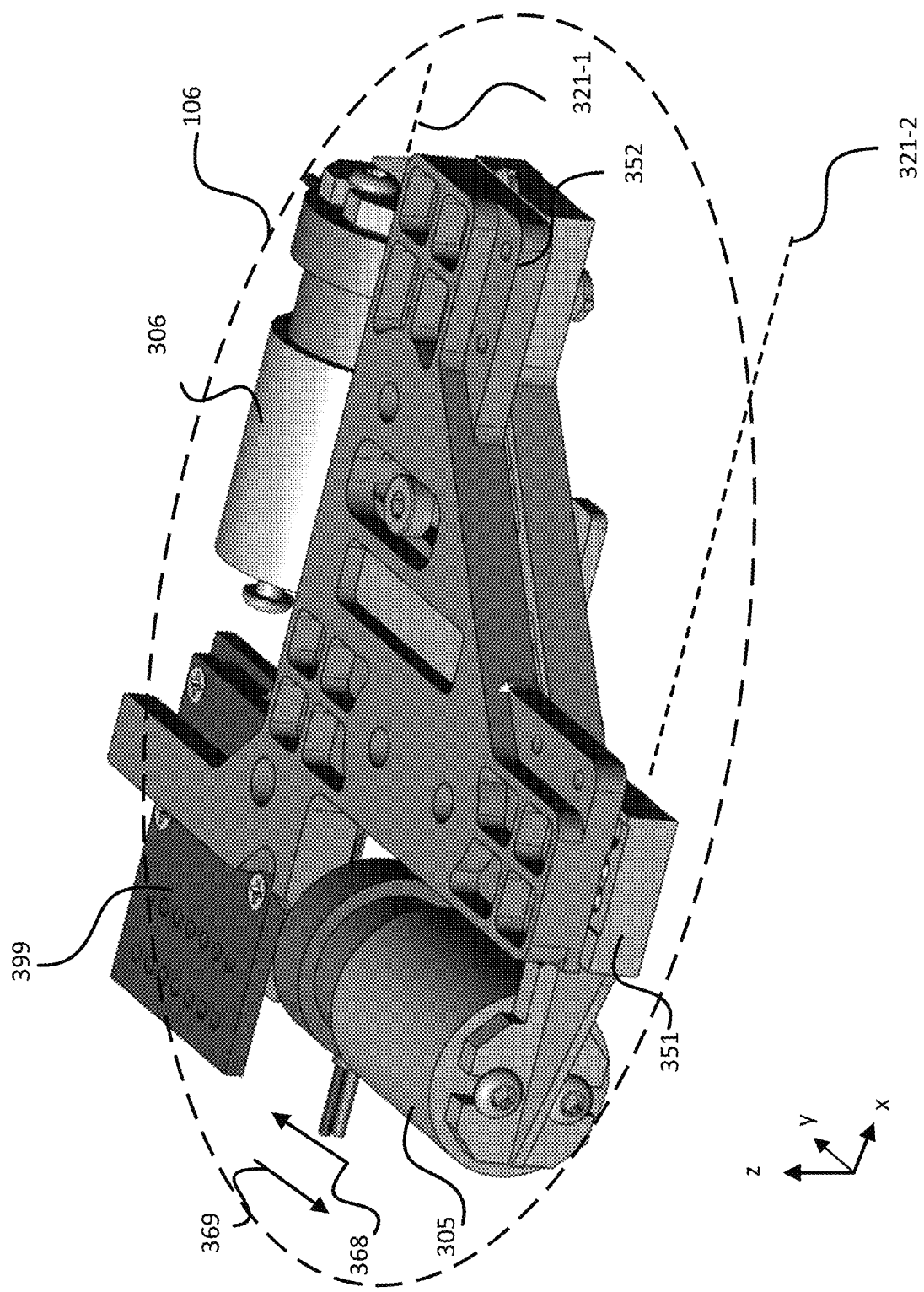
FIG. 3A-FIG. 3B illustrate a perspective view of a varifocal actuation block that includes an anti-creep system utilized in the head-mounted display of FIG. 1 in accordance with some embodiments.
Figure 3B:
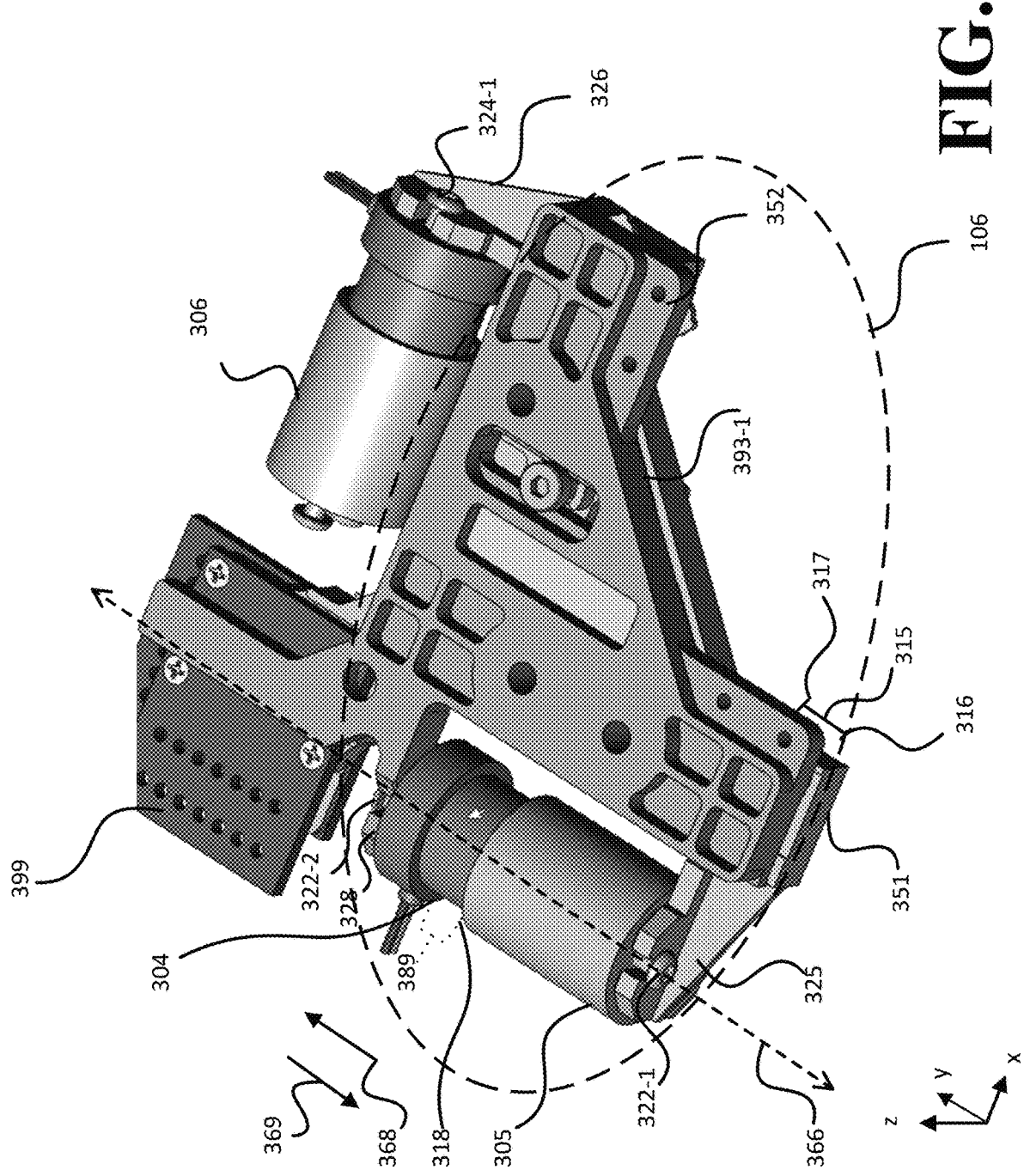
Figure 3C:
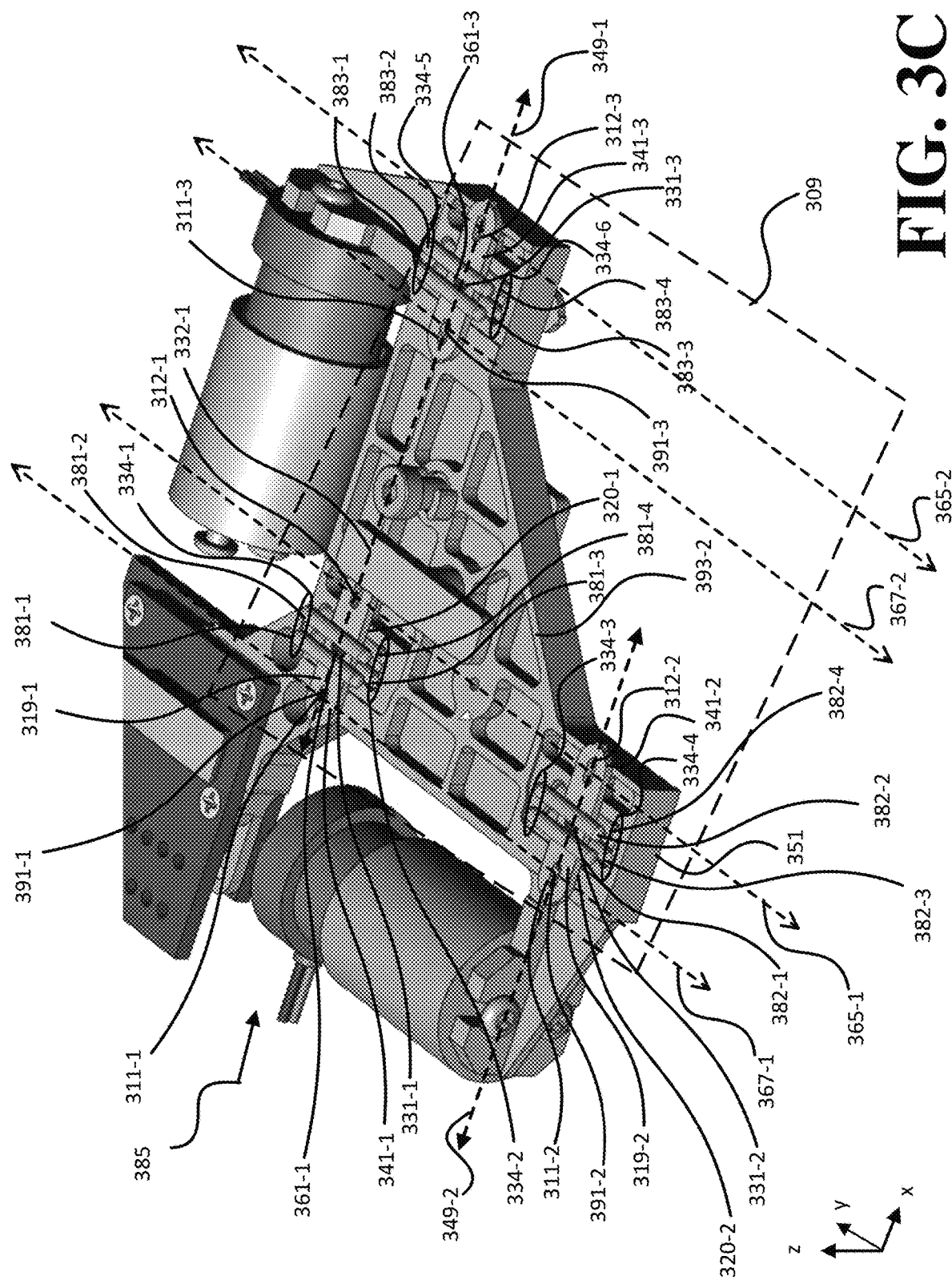
FIG. 3C illustrates a perspective view of an anti-creep system utilized in the head-mounted display of FIG. 1 in accordance with some embodiments.

FIG. 3A-FIG. 3B illustrate a varifocal actuation block 106 that includes an anti-creep system 309 utilized in the HMD 101 of FIG. 1 in accordance with some embodiments. FIG. 3C illustrates the anti-creep system 309 utilized in the varifocal actuation block 106 of the HMD of FIG. 1 in accordance with some embodiments. FIG. 3A and FIG. 3B depict a perspective view of the varifocal actuation block 106 with anti-creep mechanisms of the anti-creep system 309 not in view due to the location of anti-creep mechanisms between a fixed carriage 351 and a movable carriage 352 (discussed further in detail below). FIG. 3C depicts a perspective view of the varifocal actuation block 106 with the anti-creep mechanisms of the anti-creep system 309 depicted in detail. In FIG. 3C, movable carriage 352 is not shown in order to illustrate the anti-creep system 309 in further detail.

In some embodiments, the varifocal actuation block 106 depicted in FIG. 3A-FIG. 3C utilizes anti-creep mechanisms 341 of anti-creep system 309 to mitigate the amount of bearing ball creep associated with bearing balls 361 that are used by fixed carriage 351 and movable carriage 352 in the varifocal actuation block 106 to move the optics block 106 to the appropriate viewing position for a user of the HMD 101. In some embodiments, in order to position optics block 104 to the appropriate viewing position for the user of the HMD 101, actuator 305 is configured to move the movable carriage 352 in a first direction 368 and a second direction 369 within a first movable carriage boundary 321-1 and a second movable carriage boundary 321-2. In some embodiments, movement of the movable carriage 352 in the first direction 368 and the second direction 369 activates the anti-creep mechanisms 341 that prevent bearing ball creep from occurring in the HMD 101.

In some embodiments, the varifocal actuation block 106 includes a fixed carriage 351, a movable carriage 352, an actuator 305, and an anti-creep system 309 (depicted in FIG. 3C). In some embodiments, the movable carriage 352 and the actuator 305 are collectively configured to control the movement of anti-creep mechanisms 341 in anti-creep system 309 during the movement of the movable carriage 352 in the first direction 368 and the second direction 369.

In some embodiments, each anti-creep mechanism 341 (e.g., anti-creep mechanism 341-1, anti-creep mechanism 341-2, and anti-creep mechanism 341-3) has an associated bearing ball slot 331 that is configured to surround bearing balls 361 (e.g., bearing ball 361-1, bearing ball 361-2, and bearing ball 361-3 depicted in FIG. 3C) to limit the motion of the bearing balls 361 when the movable carriage 352 moves in the first direction 368 and the second direction 369. In some embodiments, the positioning of the bearing balls 361 within the bearing ball slots 331, in combination with an angular positioning of the anti-creep mechanisms 341 during the movement of the movable carriage 352 in the first direction 368 or second direction 369, prevent the bearing balls 361 from having an associated bearing ball creep. As a result, in some embodiments, the anti-creep mechanisms 341 mitigate the amount of bearing creep associated with bearing balls 361 that are used to move the movable carriage 352 in the varifocal actuation block 106.

In addition to the varifocal actuation block 106, encoders 399 of focus prediction module 108 are depicted in FIG. 3A-FIG. 3C. In some embodiments, encoders 399 of focus prediction module 108 are configured to track the position or state of optics block 104 to predict to one or more future states or locations of optics block 104. As stated previously, focus prediction module 108 accumulates positional information corresponding to previous states, future states, and the current state of optics block 104. In some embodiments, focus prediction module 108 uses the accumulated information to dictate the movement of movable carriage 352 from, for example, a first movable carriage position 316 to a second movable carriage position 317 in the HMD 101 using actuator 105 of varifocal actuation block 106.

In some embodiments, fixed carriage 351 is configured to operate as a fixed base for the anti-creep system 309 (depicted as a combination of an anti-creep mechanism 341-1, an anti-creep mechanism 341-2, and an anti-creep mechanism 341-3 in FIG. 3C) of the varifocal actuation block 106. In some embodiments, fixed carriage 351 is considered fixed since the fixed carriage 351 does not move relative to the motion of the anti-creep system 309. In some embodiments, the fixed carriage 351 is secured to actuator 305 at a first securement location 325 using a first securement device 322-1. In some embodiments, the fixed carriage 351 is optionally secured to an actuator 306 at a second securement location 326 using a second securement device 324-1. In some embodiments, the first securement device 322-1 and the second securement device 324-1, in addition to third securement device 322-2 described herein, are screws, pins, or some other type of securement device configured to secure fixed carriage 351 to actuator 305 and actuator 306 and to secure movable carriage 352 to actuator 305. In some embodiments, the fixed carriage 351 is positioned in varifocal actuation block 106 to allow actuator 305, actuator 306, and encoder 399 to remain fixed to fixed carriage 351 while actuator 305 moves movable carriage 352 in the first direction 368 or the second direction 369 relative to an axis 366. In some embodiments, the axis 366 is positioned in the y-direction of the x, y, z coordinate system.

In some embodiments, with reference to FIG. 3C and FIG. 3B, the fixed carriage 351 includes fixed carriage anchor pins 391 that are configured to serve as anchors for anti-creep mechanisms 341. In some embodiments, the fixed carriage anchor pins 391 serve as anchors for the anti-creep mechanisms 341 by allowing the anti-creep mechanisms 341, which are coupled to the fixed carriage anchor pins 391 using fixed carriage slots 311, to move angularly along an anchor axis 367-1 in the first direction 368 and the second direction 369 and move angularly along an anchor axis 367-2 in the first direction 368 and the second direction 369.

In some embodiments, fixed carriage anchor pins 391 are fixed to the fixed carriage 351 along the anchor axis 367-1 and the anchor axis 367-2. For example, in some embodiments, fixed carriage anchor pin 391-1 and fixed carriage anchor pin 391-2 are positioned along the anchor axis 367-1 and fixed carriage anchor pin 391-3 is positioned along the anchor axis 367-2. In some embodiments, the fixed carriage anchor pins 391 are configured to protrude through fixed carriage slots 311 of the anti-creep mechanisms 341 (discussed further in detail below). In some embodiments, the fixed carriage slots 311 are slots in anti-creep mechanisms 341 that are used to couple the anti-creep mechanisms 341 to the fixed carriage 351 using the fixed carriage anchor pins 391. In some embodiments, the fixed carriage anchor pins 391 are configured to tether the fixed carriage slots 311 of the anti-creep mechanism 341 to the fixed carriage 351 to allow the anti-creep mechanisms 341 to move angularly along the anchor axis 367-1 and anchor axis 367-2 from the fixed carriage anchor pins 391.

In some embodiments, one or more of the carriages (e.g., movable carriage 352 and fixed carriage 351) described herein may be rigid. In some examples, the length of the carriages may be fixed. In some examples, the length of the carriages may be adjustable. For example, the length of a carriage may be manually adjustable by using, e.g., a set screw or an adjustable threaded shaft. Additionally or alternatively, the length of the carriage may be dynamically adjustable through the use of, e.g., a piezoelectric stack.

In some embodiments, movable carriage 352 is configured to operate as a moving stage that moves in the first direction 368 and second direction 369 and to control the movement of the anti-creep mechanisms 341 (e.g., anti-creep mechanism 341-1, anti-creep mechanism 341-2, and anti-creep mechanism 341-3) in anti-creep system 309 of varifocal actuation block 106. In some embodiments, movable carriage 352 is considered movable since the movable carriage 352 moves in the first direction 368 and second direction 369 relative to the anchor axis 367 whilst the fixed carriage 351 remains in a fixed position. In some embodiments, the movable carriage 352 is secured to actuator 305 at a third securement location 328 using a third securement device 322-2. In some embodiments, the third securement device 322-2 is configured to secure the movable carriage 352 to actuator 305 while the actuator 305 moves the movable carriage 352 in the first direction 368 and the second direction 369 along the anchor axis 367.

In some embodiments, movable carriage 352 includes movement control pins 392 that are configured to be coupled to movement control slots 312 of anti-creep mechanisms 341 and configured to allow movable carriage 352 to angularly move anti-creep mechanisms 341 in the first direction 368 and the second direction 369. In some embodiments, movement control pins 392 are configured to act as cams in the movement control slots 312. In some embodiments, movement control pins 392 are coupled to the anti-creep mechanisms 341 along a movement control axis 365-1 and a movement control axis 365-2. In some embodiments, movement control pin 392-1 and movement control pin 392-2 are positioned along the movement control axis 365-1 and movement control pin 392-3 is positioned along the movement control axis 365-2. In some embodiments, the movement control pins 392 are configured to protrude through movement control slots 312 of the anti-creep mechanisms 341. In some embodiments, the movement control pins 392 are configured to be coupled to the movement control slots 312 of the anti-creep mechanisms 341 in order to move the anti-creep mechanisms 341 angularly along the anchor axis 367-1 and anchor axis 367-2 in the first direction 368 and the second direction 369. In some embodiments, the movable carriage 352 is able to use the movement control pins 392 to angularly move the anti-creep mechanisms 341 to positions dictated by the movable carriage 352, since movable carriage 352 controls the movement of the anti-creep mechanisms 341 along the anchor axis 367-1 and anchor axis 367-2.

In some embodiments, the movable carriage 352 is positioned parallel to the fixed carriage 351 in varifocal actuation block 106 such that actuator 305 is able to control the movement of the movable carriage 352 in the first direction 368 and the second direction 369.

In some embodiments, the movable carriage 352 is positioned parallel to the fixed carriage 351 in varifocal actuation block 106 such that the movement control pins 392 of movable carriage 352 are coupled to movement control slots 312 at the movement control axis 365 and fixed carriage anchor pins 391 are coupled to the fixed carriage slots 311 at the anchor axis 367. For example, in some embodiments, the movable carriage 352 is positioned parallel to the fixed carriage 351 in varifocal actuation block 106 such that the movement control pin 392-1 of movable carriage 352 is coupled to movement control slot 312-1 at the movement control axis 365-1, the movement control pin 392-2 of movable carriage 352 is coupled to movement control slot 312-2 at the movement control axis 365-1, and the movement control pin 392-3 of movable carriage 352 is coupled to movement control slot 312-3 at the movement control axis 365-2. Similarly, in some embodiments, the movable carriage 352 is positioned parallel to the fixed carriage 351 in varifocal actuation block 106 such that the fixed carriage anchor pin 391-1 of fixed carriage 351 is coupled to fixed carriage slot 311-1 at the anchor axis 367-1, the fixed carriage anchor pin 391-2 of fixed carriage 351 is coupled to fixed carriage slot 311-2 at the anchor axis 367-1, and the fixed carriage anchor pin 391-3 of fixed carriage 351 is coupled to fixed carriage slot 311-3 at the anchor axis 367-2.

In some embodiments, the distance the movable carriage 352 is able to move in the first direction 368 and the second direction 369 is limited by actuation distance limitation 389 of the actuator 305 (depicted in FIG. 3B). In some embodiments, the actuation distance limitation 389 is the maximum distance actuator 305 is able to move in the first direction 368 from, for example, position 318 to position 304 and in the second direction 369 from position 304 to position 318. In some embodiments, the actuation distance limitation 389 may be, for example, 10 millimeters. In some embodiments, other actuation distance limitations may be implemented depending on, for example, the size of the actuator 305 and the HMD 101.

In some embodiments, actuator 305 is configured to control the movement of the movable carriage 352 in either the first direction 368 or the second direction 369 a movement carriage distance 315 (depicted in FIG. 3B). In some embodiments, the movement carriage distance 315 is the distance the movable carriage 352 moves from a first movable carriage position (e.g., first movable carriage position 316) to a second movable carriage position (e.g., second movable carriage position 317) in the first direction 368 or the second direction 369. In some embodiments, the movement carriage distance 315 is dictated by the focus prediction module 108 and may range from, for example, 0.01 millimeters to 10 millimeters. For example, focus prediction module 108 may dictate that actuator 105 move movable carriage 352 a movement carriage distance 315 of 3 millimeters in the first direction 368 from the first movable carriage position 316 to the second movable carriage position 317. In some embodiments, other distances of the movement carriage distance 315 may be provided by focus prediction module 108 depending on, for example, the size of the movable carriage 352 and the HMD 101. In some embodiments, actuator 305, and actuator 306 may be, for example, a voice coil motor. A piezo-electric motor, or some other suitable motor, may in some embodiments, be used as an alternative to a voice coil motor.

In some embodiments, with reference to FIG. 3C, the anti-creep system 309 includes anti-creep mechanism 341-1, anti-creep mechanism 341-2, and anti-creep mechanism 341-3. In some embodiments, anti-creep mechanism 341-1, anti-creep mechanism 341-2, and anti-creep mechanism 341-3 are configured to be utilized collectively to reduce the bearing creep associated with bearing ball 361-1, bearing ball 361-2, and bearing ball 361-3, respectively, of the varifocal actuation block 106. In some embodiments, anti-creep mechanism 341-1, anti-creep mechanism 341-2, and anti-creep mechanism 341-3 may be made of any suitable materials, such as, for example, aluminum and various other metals and alloys, various ceramic materials, and/or various plastics. In some embodiments, although three anti-creep mechanisms 341 are illustrated in the anti-creep system 340, a varying number of anti-creep mechanisms may be used to eliminate bear creep depending on, for example, the size and number of bearing balls in HMD 101.

In some embodiments, anti-creep mechanism 341-1 includes a fixed carriage slot 311-1 and a movement control slot 312-1, anti-creep mechanism 341-2 includes a fixed carriage slot 311-2 and a movement control slot 312-2, and anti-creep mechanism 341-3 includes a fixed carriage slot 311-3 and a movement control slot 312-3. In some embodiments, fixed carriage slot 311-1, movement control slot 312-1, fixed carriage slot 311-2, movement control slot 312-2, fixed carriage slot 311-3, and movement control slot 312-3 are configured to be in a shape of an oval (depicted in FIG. 4). In some embodiments, fixed carriage slot 311-1, movement control slot 312-1, fixed carriage slot 311-2, movement control slot 312-2, fixed carriage slot 311-3, and movement control slot 312-3 may be configured to be an "open" or "open-ended" shape or any other shape that allows for the creep mitigation techniques described herein. In some embodiments, the shape of the fixed carriage slots 311 and the movement control slots 312 allow fixed carriage anchor pins 391 and movement control pins 392 (discussed further in detail below) to protrude through each slot to secure the anti-creep mechanisms 341 between the fixed carriage 351 and movable carriage 352, and movement control pins 392 to move within each movement control slot 312.

In some embodiments, movement control pins 392 are configured be coupled to the movement control slots 312 at movement control axis 365-1 and to move laterally within movement control slots 312 a slot distance limited by a movement width of each movement control slot 312. In some embodiments, the movement width is the elongated width of movement control slots 312 and fixed carriage slots 311. For example, for a movement control slot 312 with a movement width of 4 millimeters, movement control pins 392 are configured to move laterally 4 millimeters within the movement control slot 312 when, for example, the movable carriage 352 moves the anti-creep mechanism 341 angularly in the first direction 368 or the second direction 369.

In some embodiments, fixed carriage anchor pins 391 are configured to be coupled to the fixed carriage slots 311 at anchor axis 367-1 to allow the fixed carriage slots 311 to move laterally along the movement width of the fixed carriage slots 311. In some embodiments, the fixed carriage slots 311 of the anti-creep mechanisms 341 are configured to move a slot distance limited by the movement width of each fixed carriage slot 311 with the fixed carriage anchor pins 391 protruding through and serving as an anchor for the fixed carriage slots 311. For example, in some embodiments, for a fixed carriage slot 311-1 with a movement width of 5 millimeters, the fixed carriage slot 311-1 (and thus anti-creep mechanism 341) is configured to move at most five millimeters about the fixed carriage anchor pin 391-1 using the movement width provided in the fixed carriage slot 311-1. In alternate embodiments, the movement width of each slot may vary depending on, for example, the size of the anti-creep mechanism 141 and HMD 101.

In some embodiments, fixed carriage anchor pins 391 and movement control pins 392 protrude through each slot at a pin length that is equivalent to (or approximately equivalent to) a slot depth of each anti-creep mechanism 341. For example, for an anti-creep mechanism 341 with a slot depth of 1 millimeter, the fixed carriage anchor pins 391 and movement control pins 392 protrude through each slot at a length of 1 millimeter. In some embodiments, fixed carriage anchor pins 391 and movement control pins 392 protrude through each slot at a length that is equivalent to (or approximately equivalent to) the slot depth of each anti-creep mechanism 341 such that the tip of each fixed carriage anchor pin 391 and movement control pin 392 is flush with a first side 319 of the anti-creep mechanism 341 and a second side 320 of the anti-creep mechanism 341, respectively. That is, in some embodiments, fixed carriage anchor pins 391 protrude through anti-creep mechanisms 341 from the second side 320 of anti-creep mechanisms 341 such that the tip of the fixed carriage anchor pins 391 are flush with the first side 319 of anti-creep mechanisms 341. In some embodiments, movement control pins 392 protrude through anti-creep mechanisms 341 from the first side 319 of anti-creep mechanisms 341 such that the tip of the movement control pins 392 are flush with the second side 320 of anti-creep mechanisms 341. Thus, in some embodiments, movement control pins 392 and fixed carriage anchor pins 391 protrude through anti-creep mechanisms 341 from opposite sides of anti-creep mechanisms 341 to allow the anti-creep mechanisms 341 to move angularly along the anchor axis 367-1 and the anchor axis 367-2. In some embodiments, fixed carriage anchor pins 391 and movement control pins 392 protrude through each slot at a length that is equivalent to (or approximately equivalent to) the slot depth of each anti-creep mechanism 341 such that the tip of each fixed carriage anchor pin 391 and movement control pin 392 is, at a minimum, flush with the first side 319 of the anti-creep mechanism 341 and the second side 320 of the anti-creep mechanism 341, respectively. In some embodiments, fixed carriage anchor pins 391 and movement control pins 392 protrude through each slot at a length that is approximately equivalent to) the slot depth of each anti-creep mechanism 341 such that the tip of each fixed carriage anchor pin 391 and movement control pin 392 is slightly proud of the first side 319 of the anti-creep mechanism 341 and the second side 320 of the anti-creep mechanism 341, respectively.

In some embodiments, with reference to anti-creep mechanism 341-1, the fixed carriage slot 311-1 is positioned to surround the fixed carriage anchor pin 391-1 such that when the fixed carriage anchor pin 391 protrudes through the fixed carriage slot 311-1, the fixed carriage anchor pin 391-1 is secured and coupled to the fixed carriage slot 311-1. In some embodiments, the movement control slot 312-1 is positioned to surround the movement control pin 392-1 such that when the movement control pin 392-1 protrudes through the movement control slot 312-1, the movement control pin 392-1 is secured and coupled to the movement control slot 312-1.

In some embodiments, because the movement control pin 392-1 is securely coupled to the movement control slot 312-1 and the fixed carriage anchor pin 391 is securely coupled to the fixed carriage slot 311-1, the movement control pin 392-1 of movable carriage 352 is able to angularly move the anti-creep mechanism 341-1 when, for example, the movable carriage 352 moves in the first direction 368 and the second direction 369. Thus, the movable carriage 352 is configured to use the fixed carriage anchor pin 391-1 as an anchor that allows the movement control pin 392-1 to control the movement of anti-creep mechanism 341-1. That is, in some embodiments, since movement control pin 392 is secured in movement control slot 312-1 and fixed carriage anchor pin 391-1 serves as an anchor for the anti-creep mechanism 341-1, the movement control pin 392 is able to angularly move the anti-creep mechanism 341-1 in the first direction 368 and the second direction 369. In some embodiments, positioning of the anti-creep mechanisms 341-1 in between the fixed carriage 351 and the movable carriage 352 such that the fixed carriage slot 311-1 is coupled to the fixed carriage anchor pin 391 and movement control slot 312-1 is coupled to the movement control pin 392 allow the anti-creep mechanism 341-1 to control the amount of bearing creep associated with the bearing ball 361-1.

In some embodiments, with reference to anti-creep mechanism 341-2, the fixed carriage slot 311-2 is positioned to surround the fixed carriage anchor pin 391-2 such that when the fixed carriage anchor pin 391-2 protrudes through the fixed carriage slot 311-2, the fixed carriage anchor pin 391-2 is secured and coupled to the fixed carriage slot 311-2. In some embodiments, the movement control slot 312-2 is positioned to surround the movement control pin 392-2 such that when the movement control pin 392-2 protrudes through the movement control slot 312-2, the movement control pin 392-2 is secured and coupled to the movement control slot 312-2.

In some embodiments, because the movement control pin 392-2 is securely coupled to the movement control slot 312-2 and the fixed carriage anchor pin 391-2 is securely coupled to the fixed carriage slot 311-2, the movement control pin 392-2 of movable carriage 352 is able to angularly move the anti-creep mechanism 341-2 when, for example, the movable carriage 352 moves in the first direction 368 and the second direction 369. Thus, the movable carriage 352 is configured to use the fixed carriage anchor pin 391-2 as an anchor that allows the movement control pin 392-2 to control the movement of anti-creep mechanism 341-2. That is, in some embodiments, since movement control pin 392-2 is secured in movement control slot 312-2 and fixed carriage anchor pin 391-2 serves as an anchor for the anti-creep mechanism 341-2, the movement control pin 392-2 is able to angularly move the anti-creep mechanism 341-2 in the first direction 368 and the second direction 369. In some embodiments, positioning of the anti-creep mechanisms 341-2 in between the fixed carriage 351 and the movable carriage 352 such that the fixed carriage slot 311-2 is coupled to the fixed carriage anchor pin 391-2 and movement control slot 312-2 is coupled to the movement control pin 392-2 allow the anti-creep mechanism 341-2 to control the amount of bearing creep associated with the bearing ball 361-2.

In some embodiments, with reference to anti-creep mechanism 341-3, the fixed carriage slot 311-3 is positioned to surround the fixed carriage anchor pin 391-3 such that when the fixed carriage anchor pin 391-3 protrudes through the fixed carriage slot 311-3, the fixed carriage anchor pin 391-3 is secured and coupled to the fixed carriage slot 311-3. In some embodiments, the movement control slot 312-3 is positioned to surround the movement control pin 392-3 such that when the movement control pin 392-3 protrudes through the movement control slot 312-3, the movement control pin 392-3 is secured and coupled to the movement control slot 312-3.

In some embodiments, because the movement control pin 392-3 is securely coupled to the movement control slot 312-3 and the fixed carriage anchor pin 391-3 is securely coupled to the fixed carriage slot 311-3, the movement control pin 392-3 of movable carriage 352 is able to angularly move the anti-creep mechanism 341-3 when, for example, the movable carriage 352 moves in the first direction 368 and the second direction 369. Thus, the movable carriage 352 is configured to use the fixed carriage anchor pin 391-3 as an anchor that allows the movement control pin 392-3 to control the movement of anti-creep mechanism 341-3. That is, in some embodiments, since movement control pin 392-3 is secured in movement control slot 312-3 and fixed carriage anchor pin 391-3 serves as an anchor for the anti-creep mechanism 341-3, the movement control pin 392-3 is able to angularly move the anti-creep mechanism 341-3 in the first direction 368 and the second direction 369. In some embodiments, positioning of the anti-creep mechanisms 341-3 in between the fixed carriage 351 and the movable carriage 352 such that the fixed carriage slot 311-3 is coupled to the fixed carriage anchor pin 391-3 and movement control slot 312-3 is coupled to the movement control pin 392-3 allow the anti-creep mechanism 341-3 to control the amount of bearing creep associated with the bearing ball 361-3.

In some embodiments, in addition to being coupled to fixed carriage anchor pins 391 and movement control pins 392, anti-creep mechanisms 341 are positioned in between sets of bearing races 334 (bearing ball cradle pins 334) such that bearing ball slots 331 of anti-creep mechanisms 341 surround bearing balls 361 (while still allowing the anti-creep mechanisms 341 to angularly move in the first direction 368 and the second direction 369). In some embodiments, anti-creep mechanisms 341 are position in between the sets of bearing ball cradle pins 334 such that there is a clearance on either side (e.g., first side 319-1 and second side 320-1) of the anti-creep mechanisms 341. In some embodiments, the clearance may be, for example, 2 millimeters on each side anti-creep mechanisms 341, or some other clearance amount that allows the anti-creep mechanisms 341 to move angularly between the sets of bearing ball cradle pins 334. In some embodiments, the bearing balls 361 are cradled in between the bearing ball cradle pins 334 on an anti-creep side 393-1 of the movable carriage 352 and bearing ball cradle pins 334 on an anti-creep side 393-2 of the fixed carriage 351.

In some embodiments, the bearing ball cradle pins 334 are configured to be used by the varifocal actuation block 106 to support bearing balls 361 during the movement of movable carriage 352 in the first direction 368 and the second direction 369. In some embodiments, the bearing ball cradle pins in each set of bearing ball cradle pins 334 may be a fixed bearing race or a moving bearing race. In some embodiments, each bearing ball cradle pin in each set of bearing ball cradle pins 334 are placed in parallel with each other at a distance dictated by, for example, the size of the bearing ball 361. For example, in bearing ball cradle pins 334-1, bearing ball cradle pin 381-1 is placed in parallel with 381-2 at a distance corresponding to the size of bearing ball 361-1. In some embodiments, the diameter of the bearing balls 361, may be, for example, 5 millimeters, or some other size that may be governed by, for example, the design of the movable carriage 352. In some embodiments, positioning of the bearing balls 361 on bearing ball cradle pins 334 allows bearing balls 361 to be guided by the bearing ball cradle pins 334 during the movement of movable carriage 352.

In some embodiments, the length and diameter of the bearing ball cradle pins 334 may be a length and diameter that allows the varifocal actuation block 106 to move the movable carriage 352 within the first movable carriage boundary 321-1 and the second movable carriage boundary 321-2. For example, the length of the bearing ball cradle pins 334 may be, 10 millimeters, 20 millimeters, and the diameter of the bearing ball cradle pins may be 2 millimeters or 3 millimeters or some other dimension depending on, for example, the size of the movable carriage 352. In some embodiments, bearing ball cradle pins 334 may be, for example, dowel pins or some other type of pin that is conducive to cradling bearing balls 361 during the movement of movable carriage 352.

In some embodiments, in operation, actuator 305 receives control current signal 385 from a power source (not shown) to move the movable carriage 352 from the first movable carriage position 316 to the second movable carriage position 317 (in either the first direction 368 or the second direction 369). In some embodiments, as the movable carriage 352 moves from the first movable carriage position 316 to the second movable carriage position 317, the bearing balls 361, which are encompassed by the bearing ball slots 331 of the anti-creep mechanisms 341, move in or ride between bearing ball cradle pins 334 in the direction of the movable carriage 352. In addition, the movement control pins 392 of the movable carriage 352 move from a first movement control pin position on the ball control axis 349 and movement control axis 365 to a second movement control pin position the movement control axis 365. In some embodiments, the first movement control pin position maps to the first movable carriage position 316 and the second movement control pin position maps to the second movable carriage position 317. In some embodiments, because movement control pins 392 are coupled to the movement control slots 312 of the anti-creep mechanisms 341, as the movable carriage 352 moves from the first movable carriage position 316 to the second movable carriage position 317 (e.g., in either the first direction 368 or the second direction 369 from ball control axis 349), anti-creep mechanisms 341 move angularly in the direction of the movable carriage 352 until the movement control pin 392 is positioned at the second movement control pin position.

In some embodiments, because anti-creep mechanisms 341 are coupled to movable carriage 352 via movement control pins 392, as the movement control pins 392 move from the first movement control pin position to the second movement control pin position, the movable carriage 352 activates anti-creep mechanisms 341 to prevent bearing ball creep associated with each bearing ball 361 from occurring. That is, in some embodiments, in order to prevent the bearing balls 361 from creeping when the movable carriage 352 moves in the first direction 368 or the second direction 369, the anti-creep mechanisms 341 are configured such that, when the movement control pins 392 of the movable carriage 352 move from the first movement control pin position to the second movement control pin position, the distance from the center point of the bearing ball slots 331 to the ball control axis 349-1 (i.e., the anti-creep bearing ball distance) is one-half the bearing ball control distance of the movement control pin 392 (depicted in further detail in FIG. 4). In some embodiments, the bearing ball control distance is the distance that movement control pin 392 moves from the first movement control pin position from the ball control axis 349 and movement control axis 365 to the second movement control pin position on the movement control axis 365 when the movable carriage 352 moves in the first direction 368 or the second direction 369.

In some embodiments, by limiting the bearing balls 361 to the anti-creep bearing ball distance and the positioning of the bearing balls 361 using bearing ball slots 331, the anti-creep mechanisms 341 prevent bearing ball creep associated with each bearing ball 361 from occurring and reduce the overall amount of bearing cage creep in HMD 101.

Figure 4:
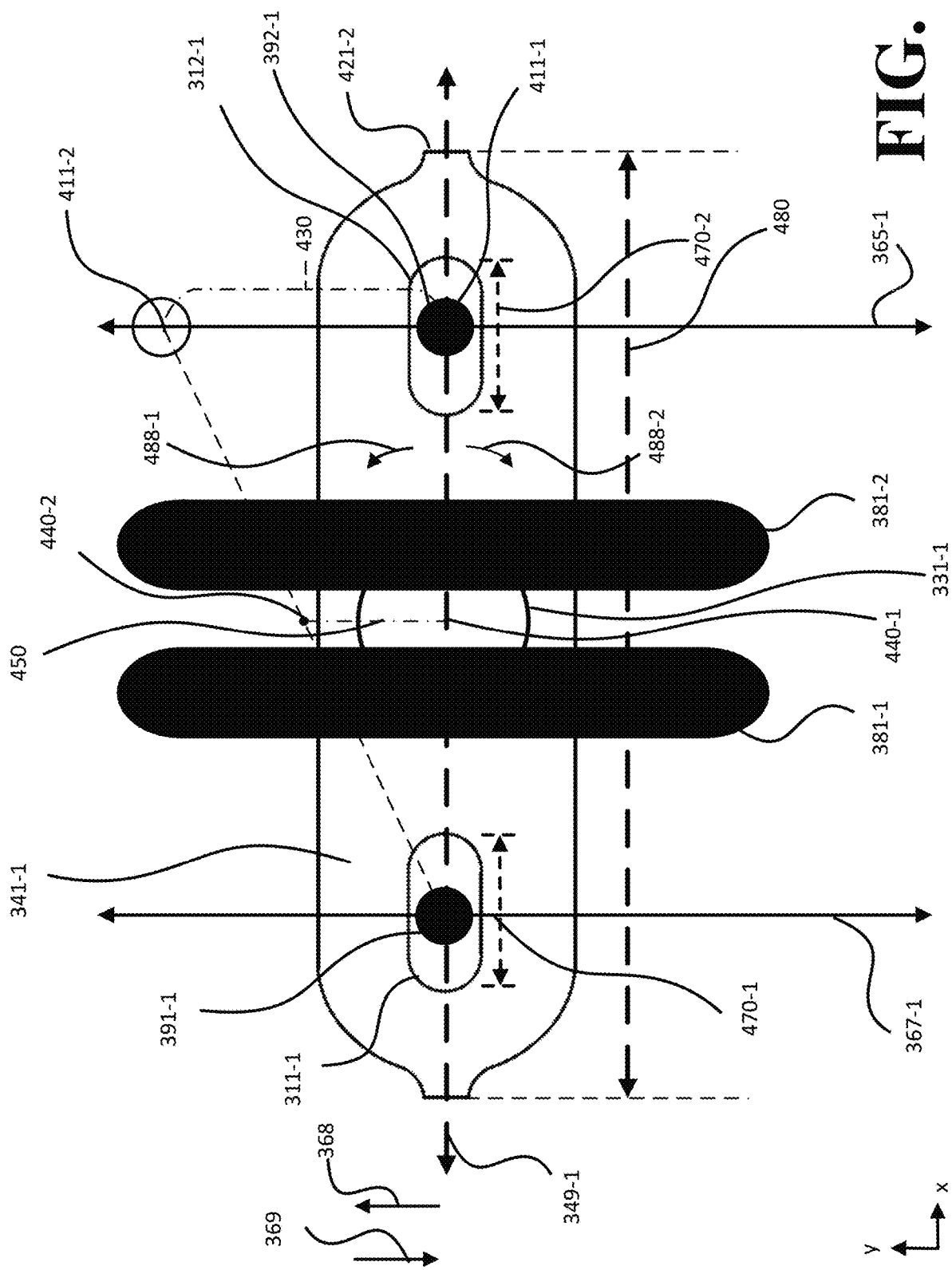
FIG. 4 illustrates a top view of an anti-creep mechanism in the anti-creep system of FIG. 1 in accordance with some embodiments.

FIG. 4 illustrates an anti-creep mechanism 341-1 that includes positioning and dimensional information related to the anti-creep mechanisms 341 of anti-creep system 309 in accordance with some embodiments. In some embodiments, similar positioning and dimensional information apply to anti-creep mechanism 341-2 and anti-creep mechanism 341-3.

In some embodiments, an anti-creep mechanism width 480 of the anti-creep mechanism 341 is depicted that represents an elongated width of the anti-creep mechanism 341-1 from a first tip 421-1 of the anti-creep mechanism 341-1 to a second tip 421-2 of the anti-creep mechanism 341-1. In some embodiments, the anti-creep mechanism width 480 may be, for example, a width of the anti-creep mechanism 341-1 that allows fixed carriage slots 311, movement control slots 312, and bearing ball slots 331 to be positioned horizontally along an elongated centered axis of the anti-creep mechanism 341, while allowing angular movement 488 in the first direction 368 or the second direction 369 relative to anchor axis 367 (depicted in FIG. 3C). In some embodiments, the anti-creep mechanism width 480 may be, for example, 200 millimeters, 300 millimeters, or some other anti-creep mechanism width that allows the aforementioned positioning of the fixed carriage slots 311, movement control slots 312, and bearing ball slots 331 on the ball control axis 349.

In some embodiments, a movement width 470 is depicted that represents the elongated width of movement control slots 312 and fixed carriage slots 311. In some embodiments, the movement width for an open-ended movement control slot described previously may vary in length, e.g., may be shorter than the movement width 470 depicted in FIG. 4 or may extend to, for example, the edge or tip of the anti-creep mechanism. In some embodiments, the movement width 470-1 of the fixed carriage slot 311-1 allows the fixed carriage slot 311-1 to move laterally with respect to the movement width 470-1 with the fixed carriage anchor pin 391-1 serving as an anchor for movement of the fixed carriage slot 311-1 in an angular direction, e.g., angular movement 488-1 or angular movement 488-2.

In some embodiments, the movement width 471-1 of the movement control slots 312 allows the movement control pins 392 to move laterally within the movement control slots 312 a slot distance limited by the movement width 471-1 of the movement control slots 312. For example, for a movement control slot 312 with a movement width of 4 millimeters, movement control pins 392 are configured to move laterally 4 millimeters within the movement control slot 312 when, for example, the movable carriage 352 moves the anti-creep mechanism 341 angularly as the movable carriage 352 moves in the first direction 368 or the second direction 369.

In some embodiments, angular movement 488 represents the angular movement of the anti-creep mechanism 341 relative to the anchor axis 367 when the movable carriage 352 moves in the first direction 368 or the second direction 369. In some embodiments, the angular movement 488 represents the angular movement of the anti-creep mechanism 341 relative to the anchor axis 367 when the movement control pin 392 moves from a first movement control pin position 411-1 to a second movement control pin position 411-2 on the movement control axis 365-1. For example, with respect to anti-creep mechanism 341-1, angular movement 488-1 represents the angular movement of the anti-creep mechanism 341-1 relative to the anchor axis 367-1 when the movement control pin 392-1 moves from the first movement control pin position 411-1 to the second movement control pin position 411-2 on the movement control axis 365-1.

In some embodiments, when the movable carriage 352 (depicted in FIG. 3B) moves in the first direction 368 from, for example, the first movable carriage position 316 to the second movable carriage position 317, the movement control pin 392-1 moves in the first direction 368 from the first movement control pin position 411-1 to the second movement control pin position 411-2. In some embodiments, as the movable carriage 352 moves in the first direction 368, the movement control pin 392-1 moves a bearing ball control distance 430 from movement control pin position 411-1 to movement control pin position 411-1. In some embodiments, the bearing ball control distance 430 is the distance a movement control pin 392 moves from a first movement control pin position 411-1 to a second movement control pin position 411-2.

In some embodiments, as a result of movable carriage 352 moving movement control pin 392 the bearing ball control distance 430, the bearing slot 331-1 (and thus the bearing ball 361 that is encompassed by the bearing ball slot 331-1) moves an anti-creep bearing ball distance 450 from a bearing ball position 440-1 on the ball control axis 349-1 to a bearing ball position 440-2. In some embodiments, the anti-creep bearing ball distance 450 is one-half the distance of the bearing ball control distance 430. In some embodiments, once the bearing ball 361 is positioned at the bearing ball position 440-2, the bearing ball 361 is prevented from creeping away from bearing ball position 440-2 at the anti-creep bearing ball distance 450 due to the positioning of the bearing ball 361 in the bearing ball slot 331-1. That is, in some embodiments, the bearing ball 361 does not creep from the anti-creep bearing ball distance 450 because of the positioning of the bearing ball 361 inside the slot anti-creep mechanism 441. Thus, by design of the anti-creep mechanism 341, the anti-creep mechanism 341 has prevented bearing ball 361 from experiencing bearing ball creep. A similar anti-creep prevention occurs using anti-creep mechanism 341-2 and anti-creep mechanism 342-3 for bearing ball 361-2 and bearing ball 361-3. As a result, the anti-creep mechanism 341-1, the anti-creep mechanism 341-2, and the anti-creep mechanism 341-3 prevent bearing ball creep from occurring in the varifocal actuation block 106 of HMD 101.

Figure 5:
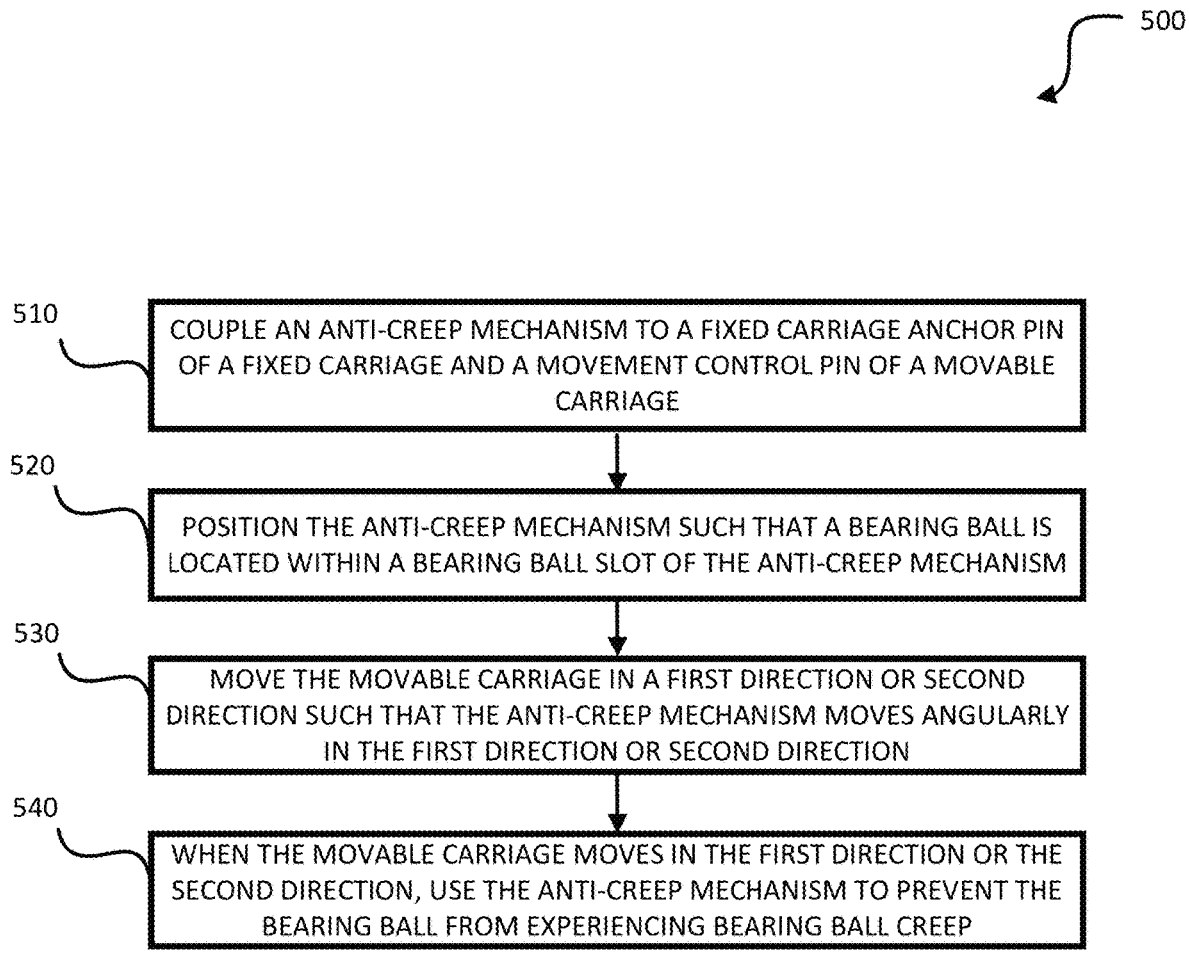
FIG. 5 is a flow diagram illustrating a method for performing creep mitigation in accordance with some embodiments.

FIG. 5 shows an embodiment of a process 500 for mitigating bearing ball creep in HMD 101 in accordance with some embodiments. In some embodiments, the process of FIG. 5 is performed by the varifocal actuation block 106 of HMD 101. Other entities may perform some or all of the steps of the process in other embodiments. Likewise, embodiments may include different and/or additional steps, or perform the steps in different orders.

In some embodiments, at block 510, an anti-creep mechanism 341 is coupled to a fixed carriage anchor pin 391 of fixed carriage 352 and a movement control pin 392 of a movable carriage 352. In some embodiments, in addition to controlling the movement of optics block 104 in HMD 101, the movable carriage 352 controls the movement of the anti-creep mechanism 341 using the movement control pin 392.

In some embodiments, at block 520, the anti-creep mechanism 341 is positioned such that a bearing ball 361 is located within a bearing ball slot 331 of the anti-creep mechanism 341. In some embodiments, the bearing ball 361 is located within the bearing ball slot 331 to limit the motion of the bearing ball 361 when the movable carriage 352 moves in the first direction 368 or the second direction 369.

In some embodiments, at block 530, the movable carriage 352 is moved in a first direction 368 or a second direction 369 using the movement control pin 392 such that the anti-creep mechanism 341 (which is coupled to the movement control pin 392 of the movable carriage 352) moves angularly in the first direction 368 or second direction 369.

In some embodiments, at block 540, when the movable carriage 352 moves in the first direction 368 or the second direction 369, the anti-creep mechanism 341 prevents the bearing ball 361 from experiencing bearing ball creep. That is, in some embodiments, the positioning of the bearing ball 361 within the bearing ball slot 331, in combination with the angular movement and positioning of the anti-creep mechanism 341 during the movement of the movable carriage 352 in the first direction 368 or second direction 369, prevents the bearing ball 361 from having an associated bearing ball creep.

In some embodiments, a center axis of the bearing ball 361 may be used as the rotation axis of the anti-creep mechanisms 341. In some embodiments, in, for example, movable carriages 352 that undergo a long travel distance (e.g., greater than 10 millimeters), the anti-creep mechanisms 341 may take the shape of a gear with its rotation axis about the bearing ball 361. In some embodiments, the gear mates to, for example, racks on the fixed race and moving race of the bearing ball cradle pins 334 to maintain a proper location of the bearing balls 361. In some embodiments, in, for example, movable carriages 352 that undergo a short travel distance (e.g., less than 10 millimeters), the anti-creep mechanisms 341 may have a first cam slot and a second cam slot (e.g., fixed carriage slots 311 and movement control slots 312) on either side of the anti-creep mechanisms 341 that mate to pins on the fixed and moving races (e.g., bearing ball cradle pins 334) to maintain the anti-creep location of the bearing ball 361. In some embodiments, travel may be limited to short ranges since a pressure angle of the slot and cam may increase with travel. In some embodiments, each ball bearing 361 may have its own associated anti-creep mechanism 341, such as is the case of, for example, a kinematically constrained system where a cage may not be practical.

In some embodiments, a bearing ball 361 (e.g., bearing ball 361-3) may be constrained by an anti-creep mechanism 341 while the other bearings balls 361 (e.g., 361-2 and 361-1) are constrained with a cage (relative to the bearing ball 361 that is constrained by the anti-creep mechanism 341).

In some embodiments, the creep mitigation techniques described herein may be utilized in multi-axis translation stages. For example, the creep mitigation techniques described herein may be utilized in mechanical pupil steering applications where translation may occur for two axes, such as, for example, a first axis in the X-direction and a second axis in the Y-direction. In some embodiments, the creep mitigation techniques described herein may be used in optical positioning stages that are used in, for example, optical table applications or setups.

In some embodiments, an apparatus includes a movable carriage; and a fixed carriage coupled to the movable carriage via an anti-creep mechanism, wherein an angular movement of the anti-creep mechanism by the movable carriage prevents a bearing ball from experiencing bearing ball creep. In some embodiments of the apparatus, the anti-creep mechanism limits a movement of the bearing ball to one-half of a movement of a movement control pin that is coupled to the movable carriage. In some embodiments of the apparatus, the anti-creep mechanism is coupled to the movable carriage using the movement control pin. In some embodiments of the apparatus, the movement control pin is configured to control the angular movement of the anti-creep mechanism. In some embodiments of the apparatus, the anti-creep mechanism includes a movement control slot, the movement control slot being configured to allow the movement control pin to control the movement of the anti-creep mechanism. In some embodiments of the apparatus, the anti-creep mechanism includes a fixed carriage slot, the fixed carriage slot being configured to be coupled to the fixed carriage. In some embodiments of the apparatus, a bearing ball slot located at a central location of the anti-creep mechanism is configured to constrain the bearing ball during the angular movement of the anti-creep mechanism. In some embodiments of the apparatus, in order to move the anti-creep mechanism angularly in a first direction, the anti-creep mechanism is coupled to an anchor pin that is coupled to the fixed carriage.

In some embodiments, a method includes positioning a bearing ball slot centrally on an anti-creep mechanism such that a bearing ball is located within the bearing ball slot of the anti-creep mechanism; and moving the anti-creep mechanism angularly in a first direction with respect to an anchor axis to prevent the bearing ball from experiencing bearing ball creep. In some embodiments of the method, in order to prevent the bearing ball from experiencing the bearing ball creep, the anti-creep mechanism limits the bearing ball to a bearing ball movement in the first direction that is one-half of a movement control pin distance that a movement control pin coupled to the anti-creep mechanism moves in the first direction. In some embodiments of the method, the movement of the anti-creep mechanism in the first direction is controlled by the movement control pin. In some embodiments of the method, the movement control pin moves from a first movement control position to a second movement control position. In some embodiments of the method, the bearing ball movement is from a first bearing ball position to a second bearing ball position. In some embodiments of the method, in order to move the anti-creep mechanism angularly in the first direction, the anti-creep mechanism is coupled to an anchor pin located on the anchor axis. In some embodiments of the method, the anchor pin is coupled to a fixed carriage and the movement control pin is coupled to a movable carriage.

In some embodiments, a head-mounted display includes a varifocal actuation block; and an optics block coupled to the varifocal actuation block, wherein an anti-creep system located in the varifocal actuation block uses an anti-creep mechanism to prevent bearing ball creep from occurring in the head-mounted display. In some embodiments of the head-mounted display, a movement control pin coupled to a movable carriage moves the anti-creep mechanism angularly in a first direction. In some embodiments of the head-mounted display, the anti-creep mechanism limits a distance a bearing ball positioned within a bearing ball slot of the anti-creep mechanism moves in the first direction to one-half of a distance a movement control pin moves in the first direction. In some embodiments of the head-mounted display, in order to move the anti-creep mechanism angularly in the first direction, the anti-creep mechanism is coupled to an anchor pin that is coupled to a fixed carriage. In some embodiments of the head-mounted display, the movable carriage is used to move the optics block in the first direction while controlling the movement of the anti-creep mechanism.

In some embodiments, for purposes of the description, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects disclosed herein are not to be considered as limiting.

What is claimed is:

1. An apparatus, comprising:
   a movable carriage;
   an anti-creep mechanism comprising a movement control slot, a bearing ball slot, and a fixed carriage slot, such that the bearing ball slot surrounds a bearing ball, wherein:
   a movement control pin of the movable carriage is coupled to the movement control slot with respect to a movement control axis;
   a fixed carriage anchor pin of a fixed carriage is coupled to the fixed carriage slot with respect to an anchor axis; and
   the fixed carriage coupled to the movable carriage via the anti-creep mechanism, wherein an angular movement of the anti-creep mechanism by the movable carriage prevents the bearing ball from experiencing bearing ball creep.

2. The apparatus of claim 1, wherein:
   the anti-creep mechanism limits a movements of the bearing ball to one-half of a movement of the movement control pin that is coupled to the movable carriage.

3. The apparatus of claim 1, wherein:
   the movement control pin is configured to move laterally along a movement width of the movement control slot.

4. The apparatus of claim 1, wherein:
   the movement control pin is configured to control the angular movement of the anti-creep mechanism.

5. The apparatus of claim 1, wherein:
   the fixed carriage anchor pin is configured to move laterally along a movement width of the fixed carriage slot.

6. The apparatus of claim 1, wherein:
   the bearing balls are configured to move between bearing ball cradle pins in a direction of the movable carriage.

7. The apparatus of claim 6, wherein:
   the bearing ball slot located at a central location of the anti-creep mechanism is configured to constrain the bearing ball during the angular movement of the anti-creep mechanism.

8. The apparatus of claim 1, wherein:
   the fixed carriage slot and movement control slot are configured to be in a shape of an oval.

9. The apparatus of claim 1, wherein the apparatus is a head mounted display comprising an electronic display, an optics block, and a varifocal actuation block, the optics block to direct light from the electronic display to an exit pupil, the varifocal actuation block comprising the anti-creep mechanism.

10. The apparatus of claim 1, wherein the apparatus is a head mounted display comprising an eye tracker to track an eye position of a user of the head mounted display.

11. The apparatus of claim 1, wherein the apparatus is a head mounted display comprising an inertial measurement unit to generate calibration data based on signals from one or more head tracking sensors.

12. The apparatus of claim 1, further comprising an optics block coupled with a varifocal actuation block, the varifocal actuation block comprising the anti-creep mechanism.

13. A method, comprising:
   positioning a bearing ball slot centrally on an anti-creep mechanism such that a bearing ball is located within the bearing ball slot of the anti-creep mechanism; and
   positioning a movement control slot on an anti-creep mechanism such that a movement control pin on a movable carriage is coupled to the movable control slot with respect to a movement control axis;
   positioning a fixed carriage slot on an anti-creep mechanism such that a fixed carriage anchor pin on a fixed carriage is coupled to a fixed carriage slot with respect to an anchor axis; and
   moving the anti-creep mechanism angularly in a first direction with respect to the anchor axis to prevent the bearing ball from experiencing bearing ball creep.

14. The method of claim 13, wherein:
   in order to prevent the bearing ball from experiencing the bearing ball creep, the anti-creep mechanism limits the bearing ball to a bearing ball movement in the first direction that is one-half a distance of the movement control pin distance, such that the movement control pin coupled to the anti-creep mechanism moves in the first direction.

15. The method of claim 13, wherein:
   the movement of the anti-creep mechanism in the first direction is controlled by the movement control pin.

16. The method of claim 13, wherein:
   the movement control pin moves from a first movement control position to a second movement control position.

17. The method of claim 13, wherein:
   the bearing ball movement is from a first bearing ball position to a second bearing ball position.

18. The method of claim 13, wherein:
   the movement control pin is configured to move laterally along a movement width of the fixed carriage slot.

19. The method of claim 13, wherein:
the fixed carriage anchor pin is configured to move laterally along a movement width of the fixed carriage slot.

* * * * *